United States Patent [19]

Matsunaga et al.

[11] 4,139,509
[45] Feb. 13, 1979

[54] HOUSEHOLD STARCH COMPOSITION PREPARED BY EMULSION-POLYMERIZING A VINYL MONOMER IN AN AQUEOUS SOLUTION OF A POLYVINYL ALCOHOL AND A NONIONIC STARCH OR CELLULOSE

[75] Inventors: Kinjiro Matsunaga, Funabashi; Shinichi Masuda, Ichikawa; Yunosuke Nakagawa, Koshigaya; Kyozaburo Tachibana, Sakura, all of Japan

[73] Assignee: Kao Soap Co., Ltd., Tokyo, Japan

[21] Appl. No.: 850,693

[22] Filed: Nov. 11, 1977

[30] Foreign Application Priority Data

Nov. 29, 1976 [JP] Japan ............................... 51-143178
Jan. 24, 1977 [JP] Japan ................................... 52-6609

[51] Int. Cl.² .............................................. C08L 3/08
[52] U.S. Cl. ............................... 260/17 R; 260/17 A; 260/17.4 ST
[58] Field of Search ............ 260/17 A, 17.4 ST, 17 R

[56] References Cited

U.S. PATENT DOCUMENTS

| | | | |
|---|---|---|---|
| 2,875,186 | 2/1959 | Gerhard et al. | 260/17 A |
| 3,001,957 | 9/1961 | Kray et al. | 260/29.6 ME |
| 3,674,711 | 7/1972 | Growald et al. | 260/17.4 ST |
| 4,011,388 | 3/1977 | Murphy et al. | 260/17 A |

*Primary Examiner*—M. J. Welsh
*Attorney, Agent, or Firm*—Blanchard, Flynn, Thiel, Boutell & Tanis

[57] ABSTRACT

A household starch composition comprises an emulsion prepared by emulsion-polymerizing a vinyl monomer in an aqueous solution of polyvinyl alcohol, nonionic modified starch or nonionic cellulose derivative in the presence of a cationic vinyl polymer or a ring-closed polymer of a cationic diallyl compound by using a cationic surface active agent or a cationic monomer or both thereof. Another composition comprises an emulsion obtained by emulsion-polymerizing a vinyl monomer in an aqueous solution of a nonionic water-soluble polymer in the presence of a cationic cellulose or cationic starch by using a cationic surface active agent or a cationic monomer or both thereof.

23 Claims, 1 Drawing Figure

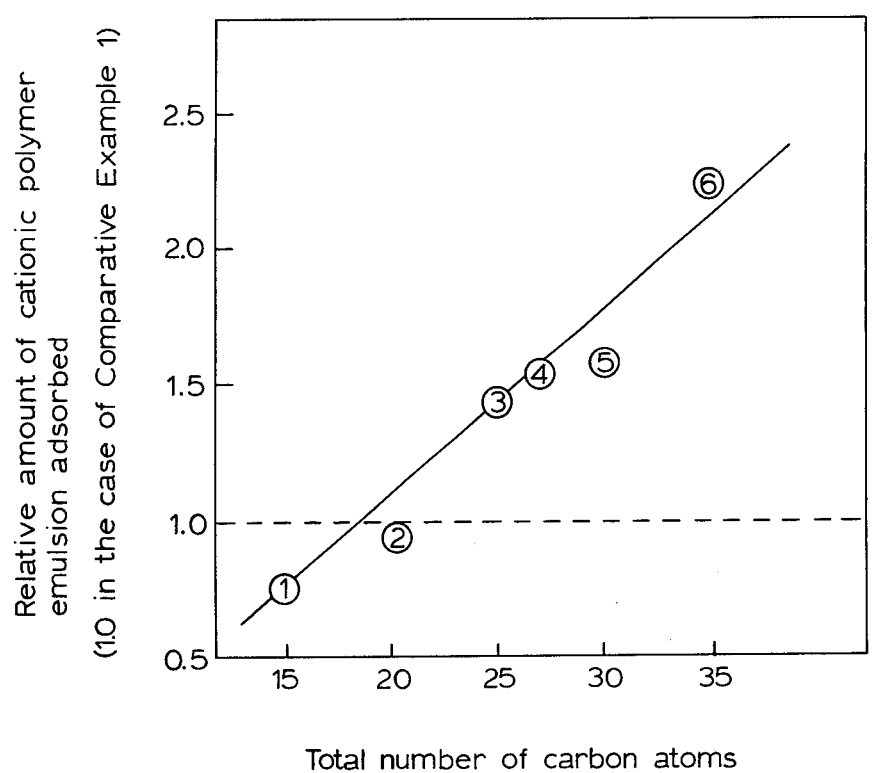

HOUSEHOLD STARCH COMPOSITION PREPARED BY EMULSION-POLYMERIZING A VINYL MONOMER IN AN AQUEOUS SOLUTION OF A POLYVINYL ALCOHOL AND A NONIONIC STARCH OR CELLULOSE

BACKGROUND OF THE INVENTION

1. Field of the Invention

The present invention relates to a household starch composition. More particularly, the invention relates to a household starch composition comprising as an indispensable component an emulsion prepared by emulsion-polymerizing a vinyl monomer in an aqueous solution of a polyvinyl alcohol, nonionic modified starch or nonionic cellulose derivative in the presence of a cationic vinyl polymer or a ring-closed polymer of a cationic diallyl compound by using a cationic surface active agent or a cationic monomer or both of them.

2. Description of Prior Arts

Starch has heretofore been used as a household starch, and various modifications have been made to starch to facilitate the starch treatment. At the present, a liquid starch which can readily be diluted with cold water and be used very simply and conveniently and which is stable, is employed and such a liquid starch generally comprises a 10 to 15% aqueous solution of carboxymethyl cellulose, starch, polyvinyl alcohol or the like and having incorporated therein, a defoaming agent, mildewproofing agent, a fluorescent whitening agent, a perfume and the like.

These polymeric substances, namely polyvinyl alcohol, starch and carboxymethyl cellulose, are hard polymers having a glass transition temperature higher than 80° C., and they are cheap as starch materials, but when they are used for starching clothes, the clothes become too stiff and exhibit a paper-like appearance and impression. Further, the starches often damage the skin and cause roughening of the skin surface. Moreover, the finish lacks a thick feeling and is inferior in the touch. Accordingly, these starch materials are not suitable for starching high quality clothes. Still in addition, the viscosities of aqueous solutions of these polymers are high even at low concentrations and they are defective in that their handling is difficult and troublesome.

When housewives starch clothes, on the other hand, a starch is in general dissolved in a small quantity of water and a cloth is uniformly rubbed in the starch solution to cause the starch to be adsorbed in the cloth. When the quantity of water is too small, the starching becomes uneven or the neck or sleeve edge is readily folded. In order to avoid the occurrence of such inconvenience, it is preferred to perform starching by using a sufficient quantity of water. However, the majority of the starch dissolved in the water is discharged with the waste water, and therefore, this method is defective because the paste is wastefully consumed.

As a starch composition overcoming these defects and disadvantages, there has recently been developed and marketed a household starch composition comprising as a main component a polyvinyl acetate emulsion.

In emulsions of this type, there are incorporated a surface active agent as an emulsifying dispersant for dispersing the polymer into water and a water-soluble polymer, such as polyvinyl alcohol, as a protective colloid for stabilizing the emulsified particles. As is well-known in the art, these additives play important roles in the preparation, storage and application of the products. Protective colloids which have heretofore been mainly studied and used for industrial products are nonionic and anionic polymers, and most of the surface active agents used as emulsifying dispersants are nonionic or anionic. Accordingly, most of the emulsion polymers now marketed are nonionic or anionic emulsion polymers.

In cationic polymer emulsions, since the polymer particles are cationically charged, electric attractive forces are generated between such polymer particles and fibers or synthetic resins that are generally negatively charged in water and therefore, manifestation of such effects as prompt deposition and sticking, tight adhesion and quick attainment of water resistance are expected. However, the quantities and kinds of these cationic polymer emulsions which are manufactured on an industrial scale are much limited.

As the process for the production of cationic polymer emulsions, there are known, for example, a process in which emulsion polymerization is carried out in the presence of a nonionic surface active agent or an anionic surface active agent and the ionic characteristic is reversed by addition of a cationic surface active agent while preventing coagulation of the dispersed polymer by addition of a nonionic surface active agent or an amphoteric surface active agent, a process in which emulsion polymerization is carried out in the presence of a cationic surface active agent (disclosed in, for example, Japanese Patent Publication No. 12125/64, Japanese Patent Application Laid-Open Specification No. 122584/74, Japanese Patent Publication No. 98990/75 and Japanese Patent Publication No. 26589/75), a process in which a cationic vinyl monomer is emulsion-polymerized with another vinyl monomer to form a cationic emulsifiable polymer (disclosed in, for example, Japanese Patent Publications No. 25707/70, No. 9410/72, No. 38108/74 and 60593/75), and a process in which a water-soluble cationic polymer is used as a protective colloid (disclosed in, for example, U.S. Pat. No. 3,001,957 and Japanese Patent Application Laid-Open Specification No. 9899/75).

In general, these cationic polymer emulsions are inferior in their stability to ordinary anionic or nonionic emulsified polymers, and a practically sufficient cationic characteristic is not imparted to them and their selective adhesion to fibers or the like is insufficient.

SUMMARY OF THE INVENTION

The present invention eliminates the foregoing defects involved in the conventional cationic polymer emulsions. According to the present invention, an emulsion for a starch, which has an excellent storage stability and a high sticking property to fibers, is provided by emulsion-polymerizing a vinyl monomer in the presence of a cationic polymer by using a cationic monomer or a cationic surface active agent or both of them.

More specifically, in accordance with the present invention, there is provided a starch composition comprising as an indispensable component an emulsion prepared by emulsion-polymerizing a vinyl monomer in an aqueous solution of a polyvinyl alcohol, nonionic modified starch or nonionic cellulose derivative in the presence of a cationic vinyl polymer or a ring-closed polymer of a cationic diallyl compound by using a cationic surface active agent or a cationic monomer or both of them.

BRIEF DESCRIPTION OF DRAWING

The drawing is a graph illustrating the relation between the total number of carbon atoms in the alkyl groups of the cationic surface active agent used in Example 11 and the relative amount of the cationic polymer emulsion adsorbed in the polymer sample (calculated on the assumption that the amount adsorbed of the polymer emulsion obtained in Comparative Example 1 is 1).

DETAILED DESCRIPTION OF THE INVENTION

As the vinyl monomer that is used in the present invention, there can be mentioned, for example, vinyl esters of fatty acids such as vinyl acetate and vinyl propionate, esters of acrylic and methacrylic acids such as methyl acrylate, ethyl acrylate, 2-ethylhexyl acrylate, methyl methacrylate, ethyl methacrylate and butyl methacrylate, and acrylamide, styrene, butadiene and chloroprene. Among them, vinyl acetate is most preferred. Vinyl monomers capable of reacting with an alkali to form a salt, for example, acrylic acid, methacrylic acid and maleic anhydride, are not included in the scope of the present invention.

The vinyl monomer is used at a concentration of 20 to 60% by weight, preferably 25 to 50% by weight, based on the final emulsion.

In the present invention, it is preferred to use a cationic vinyl polymer having a viscosity of 3 to 500 centipoises as measured at 20° C. with respect to a 1% aqueous solution. Preferred structures for the cationic vinyl polymer that is used in the present invention are those represented by the following general formulae (1) to (4):

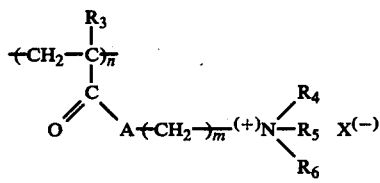
(1)

wherein R₃ stands for a hydrogen atom or a methyl group, R₄, R₅ and R₆, which may be the same or different, stand for an alkyl group or substituted alkyl group having 1 to 4 carbon atoms in the alkyl moiety, A stands for an oxygen atom or a nitrogen atom in the amide linkage, m is an integer of from 1 to 10, and X stands for an anion.

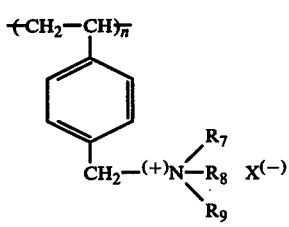
(2)

wherein $R_7$, $R_8$ and $R_9$, which may be the same or different, stand for a hydrogen atom or an alkyl group or substituted alkyl group having 1 to 2 carbon atoms in the alkyl moiety, and X stands for an anion.

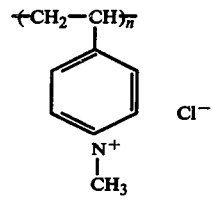

[poly(N-methylvinylpyridium chloride)]

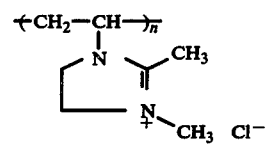
(4)

[poly(N-vinyl-2,3-dimethylimidazolinium chloride)]

Among polymers represented by the general formula (1), for example, poly(N-acrylamidopropyl-3-trimethylammonium chloride) of the following formula (5) is most preferred.

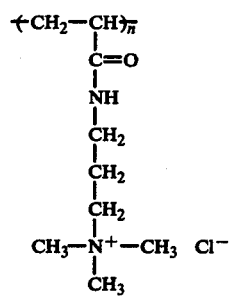
(5)

A preferred structure of the ring-closed polymer of the cationic diallyl compound that is used in the present invention is one represented by the following formula (6):

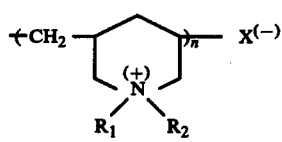
(6)

wherein R₁ and R₂, which may be the same or different, stand for an alkyl group or substituted alkyl group having 1 to 2 carbon atoms in the alkyl moiety, and X stands for an anion.

In the above preferred structure, it is especially preferred that both of the groups R₁ and R₂ stand for a methyl group.

The above-mentioned cationic vinyl polymer or ring-closed polymer of the cationic diallyl compound is used in an amount of 0.05 to 3% by weight, preferably 0.1 to 1% by weight, based on the final emulsion.

In the present invention, it is preferred that the cationic monomer be one having in the molecule at least one nitrogen atom and at least one double bond. Examples of the preferred cationic monomer are those having any of structures represented by the following formulae (7) to (10):

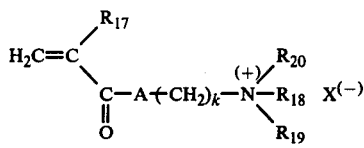 (7)

wherein $R_{17}$ stands for a hydrogen atom or a methyl group, $R_{18}$, $R_{19}$ and $R_{20}$, which may be the same or different, stand for a hydrogen atom or an alkyl or substituted alkyl group having 1 to 22 carbon atoms in the alkyl moiety, X stands for an anion, k is an integer of from 1 to 10, A stands for an oxygen atom or a nitrogen atom of the amide linkage, and $R_{18}$, $R_{19}$ and $R_{20}$ may form together a ring with N.

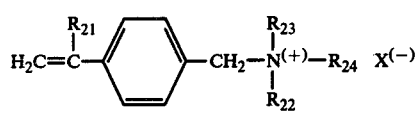 (8)

wherein $R_{21}$ stands for a hydrogen atom or a methyl group, $R_{22}$, $R_{23}$ and $R_{24}$, which may be the same or different, stand for a hydrogen atom or an alkyl group or substituted alkyl group having 1 to 2 carbon atoms in the alkyl moiety, and X stands for an anion.

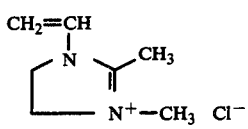 (9)

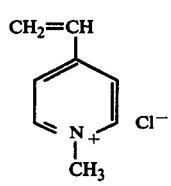 (10)

Among the above exemplified compounds, vinylbenzyltrimethyl ammonium chloride and acrylic acid and methacrylic acid esters of hydroxyalkyltrialkyl ammonium salts are especially preferred.

The cationic monomer is added in an amount of 0 to 2% by weight, preferably 0.02 to 1% by weight, based on the final emulsion.

Any of the cationic surface active agents having such water-solubility that they can be completely dissolved when used in the amounts specified in the present invention can be used as the cationic surface active agent in the present invention. Cationic surface active agents having a structure represented by any of the following general formulae (11) to (18) are effectively used in the present invention:

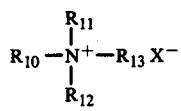 (11)

wherein $R_{10}$, $R_{11}$, $R_{12}$ and $R_{13}$ each stand for a hydrogen atom, an alkyl group having at least one carbon atom or a hydroxyalkyl group having at least one carbon atom with the proviso that the sum of carbon atoms of these groups is 25 to 50, preferably at least 30, and X stands for an anion.

 (12)

wherein $R_{14}$ stands for an alkyl group or substituted alkyl group having at least 8 carbon atoms in the alkyl moiety, $R_{15}$ and $R_{16}$, which may be the same or different, stand for an alkyl group or substituted alkyl group having at least one carbon atom in the alkyl moiety with the proviso that the sum of carbon atoms of the groups $R_{14}$, $R_{15}$ and $R_{16}$ is in the range of from 25 to 50, preferably 30 to 50, l is 2 or 3, X stands for an anion, and $R_{15}$ and $R_{16}$ may form a ring with N.

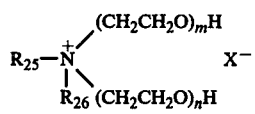 (13)

wherein $R_{25}$ stands for an alkyl group having at least 8 carbon atoms or a group $RCOOCH_2CH_2$ (in which R is an alkyl group), $R_{26}$ stands for an alkyl group having at least one carbon atom, and m and n stand for an integer with the proviso that the sum of m and n is at least 2.

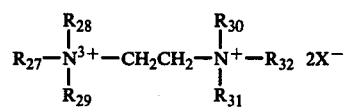

wherein $R_{27}$ stands for an alkyl group having at least 8 carbon atoms, and $R_{28}$ to $R_{32}$ stand for an alkyl group having 1 to 3 carbon atoms or a hydroxyalkyl group having 1 to 5 carbon atoms with the proviso that the sum of carbon atoms in the molecule is in the range of from 25 to 50.

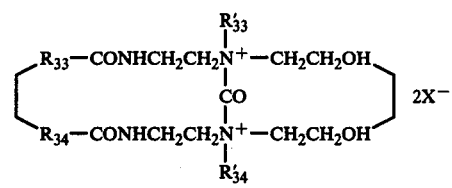 (15)

wherein $R_{33}$ and $R_{34}$ stand for an alkyl group having at least 8 carbon atoms, $R_{33}'$ and $R_{34}'$ stand for a hydrogen atom or an alkyl group having 1 to 3 carbon atoms, and X stands for an anion.

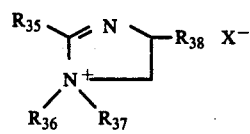 (16)

wherein $R_{35}$ stands for an alkyl group having at least 8 carbon atoms, $R_{36}$ stands for —H, —$CH_2CH_2OH$ or —$CH_2CH_2NHCOR_{39}$ (in which $R_{39}$ is an alkyl group having at least 1 carbon atom), $R_{37}$ stands for —H or an alkyl group having 1 to 5 carbon atoms, $R_{38}$ stands for —H or —$CH_2OH$, and the sum of carbon atoms of the groups $R_{35}$, $R_{36}$, $R_{37}$ and $R_{38}$ is at least 25, preferably 30 to 50.

wherein $R_{40}$ stands for an alkyl group having at least 12 carbon atoms, preferably 20 to 50 carbon atoms, —RO—, —RCOOCH$_2$—, —RCONHCH$_2$— or —RCOOCH$_2$CH$_2$NHCOCH$_2$— (in which R stands for an alkyl group having at least 12 carbon atoms, preferably 20 to 50 carbon atoms),

stands for a pyridinium, quinolinium or isoquinolinium group, and X stands for an anion.

wherein $R_{41}$ stands for an acyl group or alkyl group having at least 12 carbon atoms, preferably 25 to 50 carbon atoms, and n is an integer of at least 1.

Among the above exemplified cationic surface active agents, those represented by the above formula (11) in which $R_{10}$, $R_{11}$, $R_{12}$ and $R_{13}$, which may be the same or different, stand for an alkyl group or substituted alkyl group and the sum of carbon atoms of these groups is in the range of from 25 to 50 are especially preferred.

The cationic surface active agent is added in an amount of 0 to 5% by weight, preferably 0.2 to 1.5% by weight, based on the final emulsion.

The modified starch that is used in the present invention includes water-soluble modified starches such as hydroxyethylated starch, hydroxypropylated starch and the like.

The polyvinyl alcohol that is used in the present invention includes partially and completely saponified products of vinyl acetate homopolymers and copolymers of vinyl acetate with another comonomer, and polyvinyl alcohol derivatives formed by modifying such saponified products with, for example, an aldehyde. All of these polymers are included so far as the viscosity is 5 to 10,000 centipoises as measured at 30° C. with respect to a 5% aqueous solution.

The nonionic cellulose derivative that is used in the present invention includes water-soluble hydroxyalkylated celluloses and alkyl celluloses having a viscosity of 5 to 10,000 centipoises as measured at 30° C. with respect to a 5% aqueous solution. For example, there can be mentioned hydroxyethyl cellulose, hydroxypropyl cellulose and methyl cellulose (degree of methylation of 10%).

The above-mentioned polyvinyl alcohol, modified starch or nonionic cellulose derivative is incorporated in an amount of 0.5 to 10% by weight, preferably 1.0 to 4.0% by weight, based on the final emulsion.

As the polymerization initiator that is used for practising the present invention, 2,2′-azobis(2-amidinopropane) is most preferred, but there may also be used hydrogen peroxide, t-butyl hydroperoxide, cumene hydroperoxide, t-butyl peroxide, methylethylketone peroxide, cyclohexanone peroxide, peracetic acid, perbenzoic acid and the like. It is preferred that the polymerization initiator be used in an amount of 0.01 to 5.0% by weight based on the vinyl monomer.

The reaction temperature is 40 to 120° C., preferably 50 to 90° C. The polymerization is carried out at a pH of 3 to 9, preferably 4 to 8. It is preferred that an inorganic salt such as sodium carbonate, sodium bicarbonate, sodium orthophosphate, sodium secondary phosphate, sodium primary phosphate, sodium chloride or sodium sulfate be added as a buffering agent in an amount of 0.05 to 2% by weight, especially 0.1 to 1% by weight.

Accordingly, an emulsion for production of a starch according to the present invention may be prepared by emulsion polymerization of the following composition:

| Component | Amount (% by weight) | Preferred Amount (% by weight) |
|---|---|---|
| vinyl monomer | 20 – 60 | 25 – 50 |
| polyvinyl alcohol, modified starch or cellulose derivative | 0.5 – 10 | 1.0 – 4.0 |
| water-soluble cationic polymer | 0.05 – 3 | 0.1 – 1 |
| cationic monomer | 0 – 2 | 0.02 – 1 |
| cationic surface active agent | 0 – 5 | 0.2 – 1.5 |
| polymerization initiator | 0.01 – 5 | 0.02 – 1 |
| inorganic salt | 0.05 – 2 | 0.1 – 1 |

All the components may be added simultaneously to effect the reaction, but it is preferred to adopt a method in which the vinyl monomer is gradually added to a reaction vessel in which all the components other than the vinyl monomer have been charged.

As pointed out hereinbefore, the emulsion of the present invention is prepared by emulsion-polymerizing, by using a cationic surface active agent or cationic monomer or both of them, a vinyl monomer other than said cationic monomer in an aqueous solution of a polyvinyl alcohol, nonionic modified starch or nonionic cellulose derivative in the presence of a cationic vinyl polymer or a ring-closed polymer of a cationic diallyl compound. When the cationic monomer is used for the emulsion polymerization, an effect of adjusting the size of the polymer particles by adjusting the amount of the cationic monomer or adopting an appropriate structure thereof can be manifested simultaneously with the stabilizing effect and other effects. Moreover, the cationic vinyl polymer or the ring-closed polymer of the cationic diallyl compound exerts not only a stabilizing effect as a protective colloid for the polymer particles but also an effect of promoting adhesion of the polymer particles to a cloth which is readily charged negatively in water. In the emulsion polymerization, the cationic surface active agent forms a micelle and solubilizes the vinyl polymer to impart polymerization sites thereto. Further, the cationic surface active agent imparts a dispersion stability to the resulting polymer and charges the polymer particles positively, whereby adhesion of the polymer particles to a cloth which is charged weakly negatively in water can be remarkably enhanced. This effect of charging the polymer particles positively and enhancing adhesion to clothes is synergistically improved by the combined use of the cationic monomer and cationic surface active agent. Accordingly, this effect is highest in an emulsion containing both the cationic monomer and the cationic surface active agent.

The emulsion of the present invention to be used for a household starch composition can be sufficiently used as a household starch even if it does not include the above-mentioned polyvinyl alcohol, nonionic modified starch or nonionic cellulose derivative. However, if such polyvinyl alcohol, nonionic modified starch or nonionic cellulose derivative is used in combination with the cationic vinyl polymer or the ring-closed polymer of the cationic diallyl compound, the stability of the emulsion is further enhanced, and properties given to starched clothes, for example, good starch stiffness, can be remarkably improved. Namely, if good starch stiffness is given to, for example, a white shirt or blouse by starching, on ironing a trim and neat feel or appearance is given to the cloth and this finish is durable for a long time. On the other hand, in the area falling in contact with the skin, the applied starch is softened by the body temperature and the skin is prevented from being irritated or stimulated, and it is free of such an undesirable property that the starch is readily dissolved out by sweat and adheres to the skin. Accordingly, the starch composition of the present invention is different from an ordinary adhesive or fiber sizing agent in which a polymer having a high adhesive force, namely a hard polymer, is desired or a polymer readily washed away by water is desired.

The present invention also provides another household starch composition which can be effectively adsorbed in various woven fabrics differing in the manner of weaving even under high bath ratio conditions at the starching procedure. This composition will be disclosed in detail below.

This household starch composition, of course, overcomes disadvantages of conventional compositions, such as described before in the specification of this application. Furthermore, this composition is effective in clothes woven according to some weaving methods. The starch composition comprises as an indispensable component an emulsion obtained by emulsion-polymerizing a vinyl monomer in an aqueous solution of a nonionic water-soluble polymer in the presence of a cationic cellulose or cationic starch by using a cationic surface active agent or a cationic monomer or both of them. The starch composition has a better adsorbing property and provides a better starch strength than noncationic polymer emulsions when it is used for starching various clothes differing in the manner of weaving.

Vinyl acetate is most preferred as the vinyl monomer that is used for forming the emulsion of the present invention. In addition, there may be used, for example, vinyl esters of lower fatty acids such as vinyl butyrate and vinyl propionate, acrylic acid esters such as methyl acrylate, ethyl acrylate and butyl acrylate, and methacrylic acid esters such as methyl methacrylate, ethyl methacrylate and butyl methacrylate. Monomers copolymerizable with the above vinyl monomers, such as styrene and ethylene, can be used together with the foregoing vinyl monomers.

The amount used of the monomer is 20 to 60% by weight, preferably 25 to 50% by weight, based on the final emulsion.

As the cationic surface active agent that is used in the present invention, there can be used, for example, those represented by the following formulae (101) to (102).

⊙ Quaternary ammonium salts represented by the following general formulae (101) and (102):

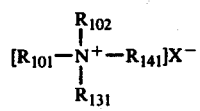

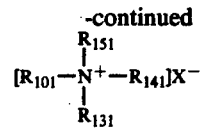

⊙ Imidazolinium salts represented by the following general formula (103):

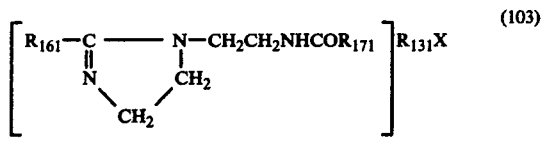

⊙ Quaternary amido-ammonium salts represented by the following general formulae (104), (105) and (106):

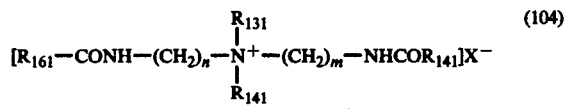

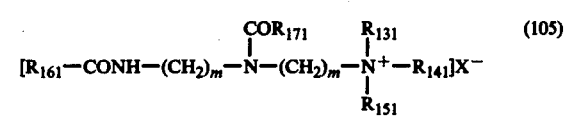

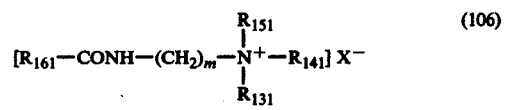

⊙ Cationic polyamides represented by the following general formula (107):

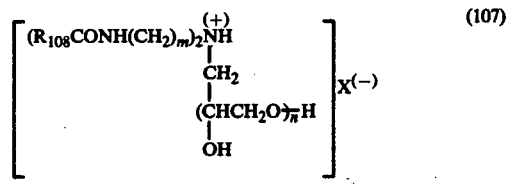

(The above cationic polyamides are compounds prepared by reacting 1 mole of diethylene triamine or dipropylene triamine with about 2 moles of a fatty acid having 12 to 24 carbon atoms to form a condensate having an acid value lower than 10, adding about 1 to about 2 moles of epichlorohydrin to the so formed condensate, subjecting the resulting adduct to ring-opening polymerization in the presence of an alkaline agent and neutralizing the resulting polymer.)

In the above general formulae (101) to (107), $R_{101}$, $R_{102}$, $R_{161}$ and $R_{171}$ each stand for an alkyl group having 11 to 22 carbon atoms or a $\beta$-hydroxyalkyl group having 13 to 24 carbon atoms, $R_{131}$, $R_{141}$ and $R_{151}$ each stand for an alkyl or hydroxyalkyl group having 1 to 3 carbon atoms, a benzyl group or a group $-(CH_2CH_2O)_nH$, $R_{108}$ stands for an aliphatic group having 12 to 24 carbon atoms, n is a number of from 1 to 3, m is 2 to 3, and X stands for an anion.

The cationic surface active agent that is used in the present invention is not limited to the above exemplified compounds, but other cationic surface active agents, for example, those derived from urea and biuret, can be used in the present invention. It is preferred to use a cationic surface active agent having a low solubility, and it is preferred that the total carbon number be 25 to 60, especially 30 to 50. The amount used of the cationic surface active agent is 0.1 to 3% by weight, preferably 0.2 to 1.5% by weight, based on the entire emulsion.

The cationic cellulose or cationic starch is a cationic group-containing water-soluble polymer, and it is preferred that the cationic group be a group of a quaternary ammonium ion. The cationic starch or cationic cellulose that is used in the present invention has, for example, a structure represented by the following general formula (108):

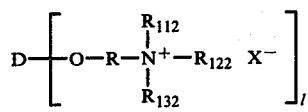
(108)

wherein D stands for a starch or cellulose residue, R stands for an alkylene or hydroxyalkylene group, $R_{112}$, $R_{122}$ and $R_{132}$ each stand for an alkyl, aryl or aralkyl group or they may form a heterocyclic ring together with the nitrogen atom in the formula, X stands for an anion (chlorine, bromine, iodine, sulfuric acid, sulfonic acid, methylsulfuric acid, phosphoric acid, nitric acid or the like), and l is a positive integer.

The degree of the cation substitution in the cationic cellulose or cationic starch is 0.01 to 1. Namely, in the cationic cellulose or cationic starch, 0.01 to 1 cationic group, preferably 0.02 to 0.5 cationic group, is introduced per anhydroglucose unit.

The viscosity of the cationic cellulose or cationic starch is 5 to 1000 centipoises, preferably 10 to 500 centipoises, as measured at 20° C. with respect to a 1% aqueous solution. The amount added of the cationic cellulose or cationic starch is 0.05 to 3% by weight, preferably 0.1 to 1% by weight, based on the total emulsion.

In practising the present invention, a small quantity of a cationic monomer is used instead of or in combination with the above-mentioned cationic surface active agent. As the cationic monomer, there can be mentioned, for example, compounds represented by the following general formulae (109) to (113):

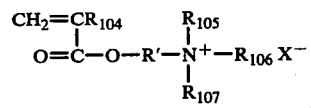
(109)

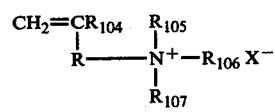
(110)

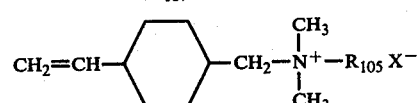
(111)

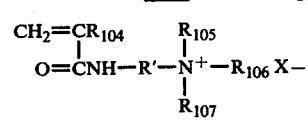
(112)

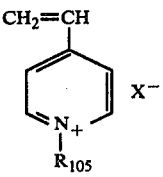
(113)

In the above general formulae (109) to (113), $R_{104}$ stands for a hydrogen atom or a methyl group, $R_{105}$, $R_{106}$, $R_{107}$ stand for a hydrogen atom or an alkyl group having 1 to 22 carbon atoms or they may form a 5- or 6-membered heterocyclic ring together with the nitrogen atom, R' stands for an alkylene group having 1 to 10 carbon atoms, preferably 2 to 4 carbon atoms, and X stands for an anion.

The amount added of the cationic monomer is 0.01 to 2% by weight, preferably 0.02 to 1% by weight, based on the total emulsion.

When a nonionic water-soluble polymer such as polyvinyl alcohol, modified starch or cellulose derivative is used in practising the present invention, properties stable over a long period can be guaranteed.

As the polyvinyl alcohol, there can be used polyvinyl acetate saponified to a degree of 70 to 100% and derivatives thereof, and as the modified starch, there can be used hydroxyethylated starch and hydroxypropylated starch. As the cellulose derivative, there can be used hydroxyethyl cellulose and hydroxypropyl cellulose.

The viscosity of the nonionic water-soluble polymer is 3 to 500 centipoises, preferably 5 to 100 centipoises, as measured with respect to a 1% aqueous solution.

It is preferred that the weight ratio of the nonionic water-soluble polymer to the cationic starch or cationic cellulose be in the range of from 3/2 to 3/0.01, especially in the range of from 3/1 to 3/0.03.

As the polymerization initiator that is used for practising the present invention, 2,2'-azobis(2-amidinopropane) is most preferred, but there may also be used hydrogen peroxide, t-butyl hydroperoxide, cumene hydroperoxide, t-butyl peroxide, methylethylketone peroxide, cyclohexanone peroxide, peracetic acid, perbenzoic acid and the like. It is preferred that the polymerization initiator be used in an amount of 0.01 to 5.0% by weight based on the vinyl monomer.

The reaction temperature is 40 to 120° C., preferably 50 to 90° C. The polymerization is carried out at a pH of 3 to 9, preferably 4 to 8. It is preferred that an inorganic salt such as sodium carbonate, sodium bicarbonate, sodium orthophosphate, sodium secondary phosphate, sodium primary phosphate, sodium chloride or sodium sulfate be added as a buffering agent in an amount of 0.05 to 2% by weight, especially 0.1 to 1% by weight.

The composition of the present invention may further comprise additives customarily used for polymer emulsions, for example, plasticizers such as dibutyl phthalate, dioctyl phthalate, dibutyl adipate, dioctyl adipate and triacetin, anti-freezing agents such as ethylene glycol, propylene glycol and ethanol, and perfumes, fungicides, antiseptics, fluorescent dyes and pigments.

When starching is conducted by using the composition of the present invention, even if the composition is diluted with a sufficient quantity of water (for example, at a bath ratio higher than 1/4,) a good starch strength can be attained and a cloth can be uniformly starched.

Excellent effects of the present invention will now be described by reference to the following Examples in which all references to "parts" are by weight.

EXAMPLE 1

In a 5-neck separable flask equipped with a thermometer, a stirrer, a reflux cooler, a nitrogen-introducing device and a metering dropping device, 8 parts of polyvinyl alcohol (completely saponified product, degree of polymerization = 1800) was dissolved in 130 parts of deionized water at 80° C. After the solution was cooled to 40° C., 0.5 part of poly (N-methylvinylpyridium chloride) and an aqueous solution of 1 part of sodium carbonate in 10 parts of deionized water were added to the solution, and the air in the flask was replaced by nitrogen. Then, 10 parts of monomeric vinyl acetate and a variable amount of methacryloxyethyltrimethyl ammonium chloride were added to the charge of the flask, and a polymerization initiator comprising 0.1 part of 2,2'-azobis(2-amidinopropane) hydrochloride and 10 parts of deionized water was added and the temperature was elevated to 70° C. to initiate the polymerization. Over a period of 100 minutes from the time at which 10 minutes had passed from the initiation of polymerization, 90 parts of monomeric vinyl acetate was continuously added. After completion of the continuous addition, aging was conducted for 1 hour at 80° C. to complete the emulsion polymerization.

The relation between the amount added of methacryloxyethyltrimethyl ammonium chloride and the particle size is illustrated in Table 1.

The particle size was measured by an optical microscope, and it is expressed in terms of the average particle size.

Table 1

|  | Sample | | | | |
| --- | --- | --- | --- | --- | --- |
|  | A* | B | C | D | E |
| Amount Added (part) | 0 | 0.05 | 0.1 | 0.2 | 0.3 |
| Particle Size (μ) | 4 | 2 | 1 | 0.5 | 0.2 |

*:comparison

When each of the foregoing samples was stored at room temperature for 1 month in the state of being packed in a glass vessel, separation of a supernatant layer was observed in sample A, but all of the emulsions B, C, D and E according to the present invention were stable.

EXAMPLE 2

In the same reaction vessel as used in Example 1, polymerization was carried out according to the method described in Example 1 in the following manner.

In 130 parts of deionized water was dissolved at 80° C. 9 parts of polyvinyl alcohol (completely saponified product, degree of polymerization = 1600). After the solution was cooled to 40° C., 1.0 part of a cationic polymer (Table 2) and an aqueous solution of 0.5 part of sodium carbonate in 5 parts of deionized water were added to the above solution. Then, air in the flask was replaced by nitrogen, and 10 parts of monomeric vinyl acetate and a cationic monomer (Table 2) were added to the charge of the flask. Then, a polymerization initiator comprising 0.1 part of 2,2'-azobis(2-amidinopropane) hydroxide and 10 parts of deionized water was added and the temperature was elevated to 70° C. to initiate polymerization. Over a period of 100 minutes from the time at which 10 minutes had passed from the initiation of polymerization, 90 parts of monomeric vinyl acetate was continuously added. After completion of the continuous addition, aging was carried out at 80° C. for 1 hour to complete the emulsion polymerization.

The kinds of the cationic polymer and the cationic monomer used and the properties of the resulting emulsions are as shown in Table 2.

Table 2

| Cationic Polymer | Cationic Monomer | Particle Size | Stability |
| --- | --- | --- | --- |
| poly(vinylbenzyltrimethyl ammonium chloride) having viscosity of 6.8 cps as measured at 30° C with respect to 10% solution (by B-type viscometer, rotor No. 1, 60 rpm) | trimethylaminoethanol acryloyl chloride (0.1 part) | 1 – 1.5μ | good |
| poly(N,N-dimethyl-3,5-methylene piperidium chloride) having viscosity of 11.5 cps as measured at 30° C with respect to 10% solution (by B-type viscometer, rotor No. 1, 60 rpm) | trimethylaminoethanol methacryloyl chloride (0.1 part) | 1 – 1.5μ | good |
| " | vinylbenzyltrimethyl ammonium chloride (0.1 part) | 0.5 – 1.5μ | good |

EXAMPLE 3

According to the method described in Example 1, an emulsion having the following composition was prepared:

| Water | 140 parts |
| --- | --- |
| Monomeric vinyl acetate | 100 parts |
| Methacryloxyethyltrimethyl ammonium chloride | 0.1 part |
| Poly(N,N-dimethyl-3,5-methylene piperidium chloride) | 0 or 2.0 parts |
| Polyvinyl alcohol (completely saponified product, degree of polymerization = 1800) | 8 parts |
| Sodium carbonate | 1 part |
| Cationic surface active agent | 0 – 5 parts |

The cationic surface active agent was added simultaneously with the cationic polymer.

The resulting emulsion was diluted with water so that the volume was increased to 50 times the original volume, and a desized 40-count cotton broadcloth was dipped in the starching liquid. The weight of the cloth was ¼ of the weight of the liquid. Then, the cloth was dehydrated and dried, and the amount of the starch stuck to the cloth was measured to obtain results shown in Table 3.

Table 3

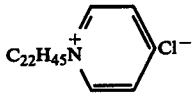

| Amount (parts) of poly(N,N-dimethyl-3,5-methylene piperidium chloride) | Cationic surface active agent | Amount (parts) of cationic surface agent | Amount (%) of starch stuck to cloth |
| --- | --- | --- | --- |
| 0* | — | 0 | 18 |
| 0* | distearyldimethyl ammonium chloride | 1 | 32 |
| 2 | — | 0 | 48 |
| 2 | distearyldimethyl ammonium chloride | 0.05 | 60 |
| 2 | " | 0.1 | 75 |
| 2 | " | 0.5 | 85 |
| 2 | " | 1 | 92 |
| 2 | " | 3 | 95 |
| 2 | " | 5 | 95 |
| 2 | $[C_{18}H_{37} \cdot CONH(CH_2)_3]_2N^+(CH_3)_2Cl^-$ | 1 | 86 |
| 2 | $C_{22}H_{45}\overset{+}{N}\text{(pyridinium)}Cl^-$ | 1 | 80 |

*comparison

EXAMPLE 4

In a 5-neck separable flask equipped with a thermometer, a stirrer, a reflux cooler, a nitrogen-introducing device and a metering dropping device, 6.4 g of polyvinyl alcohol (completely saponified product, degree of polymerization = 1800) was dissolved in 90 g of deionized water under heating. After the solution was cooled to 40° C., 0.3 g of poly(methacryloxyethyltrimethyl ammonium chloride) (having a viscosity of 200 centipoises as measured at 20° C. with respect to a 1% aqueous solution) and 0.03 g of the monomer of said polymer were completely dissolved, and 0.4 g of distearyldimethyl ammonium chloride and an aqueous solution of 1 g of sodium carbonate in 10 g of deionized water were added to the solution. Then, air in the flask was replaced by nitrogen and 8 g of monomeric vinyl acetate was added to the charge of the flask, and a polymerization initiator comprising 0.08 g of 2,2'-azobis(2-amidinopropane) hydrochloride and 10 g of deionized water was added and the temperature was elevated to 70° C. to initiate the polymerization. Over a period of 2 hours from the time at which 5 minutes had passed from the initiation of polymerization, 72 g of monomeric vinyl acetate was continuously added. After completion of the continuous addition, aging was conducted for 1 hour at 80° C. to complete the emulsion polymerization.

The solid content of the so obtained polyvinyl acetate emulsion was 44%, and the viscosity was 870 centipoises as measured at 30° C. (by a B-type viscometer, rotor No. 2, 12 rpm).

EXAMPLE 5

In a 5-neck separable flask equipped with a thermometer, a stirrer, a reflux cooler, a nitrogen-introducing device and a metering dropping device, 6.4 g of polyvinyl alcohol (completely saponified product, degree of polymerization = 1800) was dissolved in 90 g of deionized water under heating. After the solution was cooled to 40° C., 0.2 g of a cationic amide compound of the following formula:

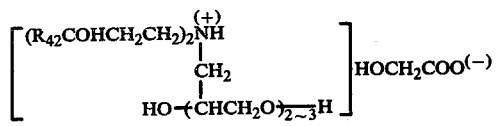

(in which $R_{42}$ has an alkyl group distribution of the carbon number in the range of from 18 to 24; this compound was prepared by reacting 1 mole of diethylene triamine with 2 moles of a fatty acid having 18 to 24 carbon atoms to form an amide having an acid value lower than 10, adding about 1 to about 2 moles of epichlorohydrin to the resulting amide, subjecting the ring-closed adduct to ring-opening polymerization so that 2.5 equivalents of the epoxy group was ring-opened and polymerized, and adding 2.5 moles of hydroxyacetic acid to the resulting polymer), 0.6 g of dimethyldistearyl ammonium chloride and 0.3 g of poly-(vinylbenzyltrimethyl ammonium chloride) were dissolved. Then, an aqueous solution of 1 g of sodium carbonate in 10 g of deionized water were added to the solution, and air in the flask was replaced by nitrogen. Then, 8 g of monomeric vinyl acetate was added to the charge of the flask, and a polymerization initiator comprising 0.08 g of 2,2'-azobis(2-amidinopropane) hydrochloride and 4 g of deionized water was added and the temperature was elevated to 70° C. to initiate the polymerization. Over a period of 2 hours from the time at which 5 minutes had passed from the initiation of polymerization, 72 g of monomeric vinyl acetate was continuously added. After completion of the continuous addition, aging was conducted for 1 hour at 80° C. to complete the emulsion polymerization.

The solid content of the so prepared polyvinyl acetate emulsion was 45% and the viscosity was 970 centipoises as measured at 30° C.

COMPARATIVE EXAMPLE 1

In a 5-neck separable flask equipped with a thermometer, a stirrer, a reflux cooler, a nitrogen-introducing device and a metering dropping device, 50 g of a 10% aqueous solution of polyvinyl alcohol (completely saponified product, degree of polymerization = 1800) and an aqueous solution of 0.2 g of sodium lauryl sulfate and 1 g of sodium carbonate in 50 g of deionized water were charged. Then, air in the flask was replaced by nitrogen and 8 g of monomeric vinyl acetate was added and the temperature was elevated to 60° C. A portion (12 g) of a polymerization initiator comprising 0.15 g of ammonium persulfate and 16 g of deionized water was dropped to initiate the polymerization. Over a period of 200 minutes from the time at which 10 minutes had passed from the start of polymerization, the remainder of the initiator solution was added, and over a period of 3 hours from the time at which 10 minutes had passed from the initiation of polymerization, 72 g of monomeric vinyl acetate was continuously added. After completion of the continuous addition, aging was conducted for 1 hour at 80° C. to complete the emulsion polymerization. The solid content of the resulting emulsion was 43% and the viscosity was 520 centipoises as measured at 30° C.

REFERENTIAL EXAMPLE 1

In a 5-neck separable flask equipped with a thermometer, a stirrer, a reflux cooler, a nitrogen-introducing device and a metering dropping device, 8 g of polyvinyl alcohol (completely saponified product, degree of polymerization = 1800) was dissolved in 130 g of deionized water under heating. After the solution was cooled to 40° C., 0.5 g of an alkyltrimethyl ammonium chloride having 14 to 18 carbon atoms and an aqueous solution of 1 g of sodium carbonate in 10 g of deionized water were added to the solution, and air in the flask was replaced by nitrogen. Then, 10 g of monomeric vinyl acetate was added to the charge of the flask, and a polymerization initiator comprising 0.1 g of 2,2'-azobis(2-amidinopropane) hydrochloride and 10 g of deionized water was added and the temperature was elevated to 60° C. to initiate the polymerization. Over a period of 2 hours from the time at which 5 minutes had passed from the initiation of polymerization, 90 g of monomeric vinyl acetate was continuously added. After completion of the continuous addition, aging was conducted for 1 hour at 80° C. to complete emulsion polymerization. The solid content of the resulting polyvinyl acetate emulsion was 42% and the viscosity was 1100 centipoises as measured at 30° C.

EXAMPLE 6

Each of the cationic and anionic polyvinyl acetate emulsions prepared in Examples 4 and 5, Comparative Example 1 and Referential Example 1 was charged in a 100 ml-capacity polyethylene sample bottle and was stored at −15° C. for 8 hours. Then, the temperature was elevated to +5° C. over a period of 10 hours and this temperature was maintained for 20 hours. Then, the temperature was lowered to −15° C. over a period of 10 hours. This cycle of freezing and thawing was repeated. The sample stored for 8 hours at −15° C. after the predetermined cycles of freezing and thawing was allowed to stand in a warm bath maintained at 30° C. for 1 hour and the viscosity of the sample was measured by a B-type viscometer (rotor No. 2, 12 rpm). Obtained results are shown in Table 4, from which it is apparent that the freeze stability of a cationic polymer emulsion including a cationic surface active agent as an emulsifier and a cationic water-soluble polymer is very good.

Separately, each of the cationic and anionic polyvinyl acetate emulsions prepared in Examples 4 and 5, Comparative Example 1 and Referential Example 1 was charged in a 100 ml-capacity sample bottle and stored at 50° C. for 30 days. Then, the sample was allowed to stand in a warm water bath maintained at 30° C. for 1 hour and the viscosity of the sample was measured by a B-type viscometer (rotor No. 2, 12 rpm) to obtain results shown in Table 5, from which it is apparent that the cationic polyvinyl acetate emulsions prepared in Examples 4 and 5 are excellent in the high temperature stability.

Table 4

| | Viscosities (centipoises, at 30° C) of Polyvinyl Acetate Emulsions | | | |
|---|---|---|---|---|
| | Number of Cycles of Freezing-Thawing | | | |
| Sample | 0 | 1 | 3 | 7 |
| Example 4 | 870 | 1060 | 1180 | 1290 |
| Example 5 | 1060 | 1190 | 1210 | 1280 |
| Comparative Example 1 | 520 | 1480 | 1520 | 1550 |
| Referential Example 1 | 1100 | gelled, measurement impossible | gelled, measurement impossible | gelled, measurement impossible |

Table 5

| | Viscosities (centipoises, at 30° C) of Polyvinyl Acetate Emulsions | | |
|---|---|---|---|
| | Initial | After 30 Days at 50° C | |
| Sample | Viscosity | Viscosity | Appearance |
| Example 4 | 870 | 720 | white, opaque |
| Example 5 | 1060 | 950 | white, opaque |
| Comparative Example 1 | 520 | 680 | white, opaque |
| Referential Example 1 | 1100 | gelled, measurement impossible | phase separation, brown |

EXAMPLE 7

Cationic polyvinyl acetate emulsions shown in Table 6 were prepared according to the method described in Examples 4 and 5. Each of the so prepared compositions had a good storage stability.

Table 6

| | Cationic Polyvinyl Acetate Emulsions | |
|---|---|---|
| Sample No. | Cationic Surface Active Agent | Cationic Water-Soluble Polymer |
| 7-1 | $(C_{18}H_{37})_2N^{\oplus}Me_2\ Cl^{\ominus}$, 0.4 g | $-(CH_2-\underset{\underset{COOCH_2CH_2NMe_3Cl^{\ominus}}{|}}{\overset{\overset{CH_3}{|}}{C}})_n-$, 0.32 g |
| 7-2 | $(C_{14}H_{29})_2N^{\oplus}Me_2Cl^{\ominus}$, 0.4 g | " |
| 7-3 | $(C_{22}H_{45})_2N^{\oplus}Me_2Cl^{\ominus}$, 0.8 g | " |
| 7-4 | $(C_{10}H_{22})_3N^{\oplus}MeCl^{\ominus}$, 0.8 g | " |
| 7-5 | $(C_{18}H_{37})_2N^{\oplus}\overset{Me}{\underset{CH_2CH_2OH}{<}}\ Cl^{\ominus}$, 0.4 g | |
| 7-6 | same as in Example 5 | $(CH_2-CH)_n$-C$_6$H$_4$-CH$_2$N$^{\oplus}$Me$_3$ Cl$^{\ominus}$, 0.6 g |

Table 6-continued

| Sample No. | Cationic Surface Active Agent | Cationic Polyvinyl Acetate Emulsions — Cationic Water-Soluble Polymer |
|---|---|---|
| 7 - 7 | " | $(CH_2-\underset{\underset{CONHCH_2CH_2N^\oplus Me_3\ Cl^\ominus}{|}}{\overset{CH_3}{C}})_n$, 0.3 g |
| 7 - 8 | " | $(CH_2-\underset{\underset{OCH_2CH_2N^\oplus Me_3\ Cl^\ominus}{|}}{\overset{CH_3}{C}})_n$, 0.5 g |
| 7 - 9 | " | piperidinium polymer structure, $Cl^\ominus$, 1.0 g |
| 7 - 10 | " | $-(CH_2-CH)_n-$ with N-methylpyridinium, $Cl^\ominus$, 0.5 g |
| 7 - 11 | " | $\left[\underset{Me}{\overset{Me}{N^\oplus}}-(CH_2CH_2O)_2CH_2CH_2-\underset{Me}{\overset{Me}{N^\oplus}}-CH_2COOCH_2-\ OCOCH_2-\right]_n$ $2Cl^\ominus$, 1.0 g |
| 7 - 12 | $C_{18}H_{37}\underset{Me}{\overset{\oplus}{N}}\underset{(CH_2CH_2O)_nH}{\overset{(CH_2CH_2O)_mH}{}}\ Cl^-\ 0.8\ g$ (m + n = 50), | $-(CH_2-CH)_n-$ with phenyl-$^\oplus NMe_3\ Cl^\ominus$, 0.35 g |
| 7 - 13 | " (m + n = 8), 0.8 g | " |
| 7 - 14 | $\left[\begin{array}{l}C_{17}H_{35}CONHCH_2CH_2\overset{H}{\underset{|}{N^\oplus}}-CH_2CH_2OH\\ \phantom{C_{17}H_{35}CONHCH_2CH_2N}CO\\ C_{17}H_{35}CONHCH_2CH_2\underset{H}{\overset{|}{N^\oplus}}-CH_2CH_2OH\end{array}\right]$ $2\ CH_3COO^\ominus$, 0.4 g | " |
| 7 - 15 | $C_{18}H_{37}$ imidazolinium with $C_{18}H_{37}$ and $CH_2CH_2NHCOC_{18}H_{37}$, $Cl^\ominus$, 0.8 g | " |
| 7 - 16 | $(C_{21}H_{43}CONHCH_2CH_2)_2\overset{\oplus}{N}\underset{CH_2-CH-CH_2}{\overset{Me}{\diagdown}}\ Cl^\ominus$ with epoxide ring, 0.8 g | " |

EXAMPLE 8

The starching treatment was carried out by using the cationic polyvinyl acetate emulsions prepared in Examples 4 and 5, and the amount of the stuck starch and the starch hardness were determined. A desized sample cloth (60-count cotton broadcloth) was wetted with water and dehydrated for 1 minute by a dehydrating machine, and it was dipped in a diluted starch liquid charged in a washbowl and lightly rubbed for 30 seconds. Then, the cloth was dehydrated for 1 minute by a dehydrating machine, air-dried and stored for 1 day in a chamber maintained at a temperature of 20° C. and a relative humidity of 65%. Then, the weight of the sample cloth was measured, and the amount of the stuck starch was calculated by substracting the weight of the sample cloth before the treatment from the thus measured weight. Separately, the air-dried sample cloth was sprinkled by spraying and pressed at 130° C. for 1 minute, and the starch hardness was measured according to the cantilever method according to JIS 1005-1959. Obtained results are shown in Tables 7 and 8.

Table 7

Amount Stuck of Polyvinyl Acetate Emulsion (% of the polymer stuck on cloth based on the used polymer

| Sample | Concentration | | | |
|---|---|---|---|---|
| | 0.8% (bath ratio of 1/1) | 0.4% (bath ratio of ½) | 0.2% (bath ratio Of ¼) | 0.1% (bath ratio of ⅛) |
| Example 4 | 95% | 88 | 84 | 78 |
| Example 5 | 93 | 92 | 90 | 81 |
| Comparative Example 1 | 73 | 54 | 30 | 19 |

Table 8

Starch Hardness (cm) of Polyvinyl Acetate Emulsion-Treated Cloth (according to cantilever method)

| Sample | Concentration | | | |
|---|---|---|---|---|
| | 0.8% (bath ratio of 1/1) | 0.4% (bath ratio of ½) | 0.2% (bath ratio of ¼) | 0.1% (bath ratio) of ⅛) |
| Example | 6.9 | 6.9 | 6.8 | 6.4 |
| Example 5 | 7.3 | 7.2 | 7.1 | 6.9 |
| Comparative Example | 6.7 | 6.3 | 6.0 | 5.7 |

From the foregoing results, it will readily be understood that the cationic polyvinyl acetate emulsions prepared in the foregoing Examples of the present invention are selectively adsorbed and stuck onto fibers which are negatively charged in water at the starching treatment. Although conventional nonionic or anionic polyvinyl acetate emulsions should be used in large quantities because of such selective adsorbing property to fibers, when the cationic polyvinyl acetate emulsions according to the present invention are used, the amounts of the starches can be reduced to 1.2 to ⅛.

When the starching treatment was similarly carried out by using the cationic polyvinyl acetate emulsions prepared in Example 7, it was found that they were superior to the conventional products with respect to both the amount of the adsorbed and stuck polymer and the starch hardness of the treated cloth.

EXAMPLE 9

The starching treatment was carried out by using the cationic polyvinyl acetate emulsions prepared in Examples 4 and 5, and the starch hardnesses of the treated clothes were determined.

A desized sample cloth (60-count cotton broadcloth) was wetted with about 17 g of water and dehydrated for 1 minute by a dehydrating machine. About 500 g of a dilution of the cationic polyvinyl acetate emulsion composition was charged in a Terg-O-Meter and agitated. Then, the sample cloth was put into the dilution, stirred at 60 rpm for 3 minutes and dehydrated for 1 minute by a dehydrating machine. Then, the sample cloth was air-dried, pressed at 130° C. for 1 minute and sprinkled by spraying. The starch hardness was measured according to the cantilever method of JIS 1005-1959 to obtain results shown in Table 9.

Table 9

Starch Hardness (cm) of Polyvinyl Acetate Emulsion-Treated Cloth (According to cantilever method*)

| Starch | Concentration | | | |
|---|---|---|---|---|
| | 0.02% (bath ratio of 1/30) | 0.03% (bath ratio of 1/30) | 0.05% (bath ratio of 1/30) | 0.1% (bath ratio 1/30) |
| Example 4 | 5.8 | 6.2 | 6.9 | 8.4 |
| Example 5 | 6.0 | 6.5 | 7.4 | 8.8 |
| Comparative Example 1 | 5.3 | 5.4 | 5.5 | 5.9 |
| Referential Example 1 | 5.6 | 5.8 | 6.2 | 7.0 |

Cantilever Method*

According to JIS 1005-1959, specimens, each having a length of 15 cm and a width of 2.5 cm, were obtained from one sample cloth, and each specimen was placed on a horizontal stand having a smooth surface and one end inclined by 45° so that the short side of the specimen was in agreement of the base line of a scale. According to an appropriate method, the specimen was slid toward the inclined face and when one end of the specimen fell into contact with the inclined face, the position of the other end was read from the scale. The starch hardness was expressed in terms of an average value of the values thus determined with respect to the 5 specimens.

EXAMPLE 10

In the same manner as described in Example 8, the starching treatment was carried out by using the cationic vinyl acetate emulsion composition sample No. 7-6 prepared in Example 7, and the starch hardness of the treated cloth was determined according to the method of JIS 1005-1959. For comparison, the polyvinyl acetate emulsion prepared in Comparative Example 1 was similarly tested. Obtained results are shown in Table 10.

Table 10

Starch Hardness (cm) of Polyvinyl Acetate Emulsion-Treated Cloth (according to cantilever method)

| Sample Cloth | Starch | Concentration | | | | |
|---|---|---|---|---|---|---|
| | | 0.1 % (bath ratio of ⅛) | 0.2 % (bath ratio of ⅛) | 0.4 % (bath ratio of ⅛) | 0.6 % (bath ratio of ⅛) | 0.8 % (bath ratio of ⅛) |
| 60-Count Cotton Broadcloth | Sample No. 7 - 6 | 6.4 | 7.2 | 8.6 | 9.3 | 9.6 |
| " | Comparative Example 1 | 5.6 | 6.2 | 6.8 | 7.5 | 7.8 |
| 80-Count Broadcloth of 65% Polyester and 35% Cotton | Sample No. 7 - 6 | 6.4 | 6.8 | 7.3 | 7.7 | 8.0 |
| " | Comparative Example 1 | 5.9 | 6.1 | 6.6 | 7.0 | 7.1 |

EXAMPLE 11

According to the method described in Example 4, cationic polymer emulsions were prepared by using 0.4 g of a cationic surface active agent and 0.3 g of poly(methacryloxyethyltrimethyl ammonium chloride) (having a viscosity of 200 centipoises as measured at 20° C. with respect to a 1% aqueous solution). As the cationic surface active agent, various cationic surface active agents differing in the total number of carbon atoms of the alkyl groups were employed separately. By using the so prepared cationic polymer emulsions, the starching treatment of sample clothes (60-count cotton broadclothes) was carried out in the same manner as described in Example 8, and the amounts of the adsorbed and stuck starches were measured. The relation between the sum of carbon atoms in the alkyl groups and the relative adsorbed amount (calculated based on the assumption that the adsorbed amount of the starch of Comparative Example 1 is 1.0) is shown in the drawing, in which ① to ⑥ show data when the following cationic surface active agents were used:
①: lauryltrimethyl ammonium chloride
②: stearyltrimethyl ammonium chloride
③: trioctylmethyl ammonium chloride
④: dilauryldimethyl ammonium chloride
⑤: dimyristyldimethyl ammonium chloride
⑥: distearyldimethyl ammonium chloride From the results shown in the drawing, it is seen that as the total number of carbon atoms in the alkyl groups of the cationic surface active agent is increased, the adsorbing property is higher. When the sum of the carbon atoms in the alkyl groups is smaller than 25, the adsorbent property of the cationic polymer emulsion is inferior to that of the anionic polymer emulsion, but when the sum of the carbon atoms in the alkyl groups is 25 or larger, the adsorbing property of the cationic polymer emulsion is much superior to that of the anionic polymer emulsion.

COMPARATIVE EXAMPLE 2

Vinyl acetate was emulsion-polymerized in the same manner as described in Example 4 except that cationic starch (degree of substitution = 0.3, viscosity of 2% aqueous solution = 450 centipoises) was used instead of the polyvinyl alcohol used in Example 4. The particle size of the resulting emulsion was about 1μ, and the viscosity was 3110 centipoises as measured at 30° C. When this polymer emulsion was stored at 50° C. for 30 minutes, the polymer emulsion was gelled and the phase separation was caused. The polymer was solidified and could not be dispersed again, and the polymer was yellowed.

EXAMPLE 12

In a 5-neck separable flask equipped with a thermometer, a stirrer, a reflux cooler, a nitrogen-introducing device and a metering dropping device, 8 parts of polyvinyl alcohol (completely saponified product, degree of polymerization = 1800) was dissolved in 130 parts of deionized water at 80° C. After the solution was cooled to 40° C., 0.5 part of trimethylaminohydroxyethylated starch of the following formula:

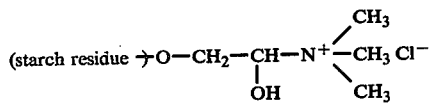

[cation substitution degree (average value of the number of the cationic group introduced per unit of anhydroglucose) = 0.5, viscosity = 30 centipoises (as measured with respect to 1% aqueous solution)], 0.5 part of distearyldimethyl ammonium chloride and an aqueous solution of 1 part of sodium carbonate in 10 parts of deionized water were added to the solution, and air in the flask was replaced by nitrogen. Then, 10 parts of monomeric vinyl acetate and 0.1 part of methacryloxyethyltrimethyl ammonium chloride were added to the charge of the flask, and a polymerization initiator comprising 0.1 part of 2,2'-azobis(2-amidinopropane) hydrochloride and 10 parts of deionized water was added and the temperature was elevated to 70° C. to initiate the polymerization. Over a period of 100 minutes from the time at which 10 minutes had passed from the initiation of polymerization, 90 parts of monomeric vinyl acetate was continuously added. After completion of the continuous addition, aging was conducted for 1 hour at 80° C. to complete the emulsion polymerization. When the particle size of the resulting emulsion was measured by an optical microscope, it was found that the average particle size was about 1μ. The solid content was 45.0%.

A starch was prepared by adding 2 parts of dibutyl adipate, 4 parts of ethanol, 0.5 part of a silicone emulsion (30% emulsion of 10000 centistoke silicone oil) and 3.5 parts of deionized water to 90 parts of the so prepared emulsion. This starch is designated as "starch P".

EXAMPLE 13

In the same reaction vessel as used in Example 12, polymerization was carried out according to the method described in Example 12 in the following manner.

In 130 parts of deionized water was dissolved at 80° C. 8 parts of polyvinyl alcohol (polyvinyl acetate saponified to a degree of saponification of 78.5%, degree of polymerization = 1600). After the solution was cooled to 40° C., 0.3 part of cationic cellulose [JR-400 manufactured by Union Carbide Corporation, hydroxyethyl substitution degree (average number of the hydroxyethyl group introduced per unit of anhydroglucose) = 1.6–2.1, cation substitution degree = 0.35–0.45, nitrogen content = 1.7–2.2%], 0.5 part of didocosanoyldimethyl ammonium chloride and an aqueous solution of 0.5 part of sodium carbonate in 5 parts of deionized water were added to the above solution. Then, air in the flask was replaced by nitrogen, and 10 parts of monomeric vinyl acetate and 0.1 part of vinylbenzyltrimethyl ammonium chloride were added to the charge of the flask. Then, a polymerization initiator comprising 0.1 part of 2,2'-azobis(2-amidinopropane) hydroxide and 10 parts of deionized water was added and the temperature was elevated to 70° C. to initiate polymerization. Over a period of 100 minutes from the time at which 10 minutes had passed from the initiation of polymerization, 90 parts of monomeric vinyl acetate was continuously added. After completion of the continuous addition, aging was carried out at 80° C. for 1 hour to complete the emulsion polymerization. The solid content was 42.5% and the particle size was about 1 to about 1.5μ in the resulting emulsion.

A starch was prepared by adding 2 parts of dibutyl phthalate, 3 parts of ethanol, 2 parts of propylene glycol, 0.5 part of a silicone emulsion (30% emulsion of 10000 centistoke silicone oil) and 1.5 parts of deionized water to 91 parts of the so formed emulsion. This starch is designated as "starch Q".

EXAMPLE 14

In a 5-neck separable flask equipped with a thermometer, a stirrer, a reflux cooler, a nitrogen-introducing device and a metering dropping device, 8 parts of polyvinyl alcohol (completely saponified product, degree of polymerization = 1800) was dissolved in 130 parts of deionized water at 80° C. After the solution was cooled to 40° C., 0.5 part of dimethylaminoethylated starch [cation substitution degree = 0.5, viscosity = 45 centipoises (as measured with respect to 1% aqueous solution)], 0.5 part of distearyldimethyl ammonium chloride and an aqueous solution of 1 part of sodium carbonate in 10 parts of deionized water were added to the solution, and air in the flask was replaced by nitrogen. Then, 10 parts of monomeric vinyl acetate and 0.1 part of methacryloxyethyltrimethyl ammonium chloride were added to the charge of the flask, and a polymerization initiator comprising 0.1 part of 2,2'-azobis(2-amidinopropane) hydrochloride and 10 parts of deionized water was added and the temperature was elevated to 70° C. to initiate the polymerization. Over a period of 100 minutes from the time at which 10 minutes had passed from the initiation of polymerization, 90 parts of monomeric vinyl acetate was continuously added. After completion of the continuous addition, aging was conducted for 1 hour at 80° C. to complete the emulsion polymerization. When the particle size of the resulting emulsion was measured by an optical microscope, it was found that the average particle size was about 1μ. The solid content was 45.0%.

A starch was prepared by adding 2 parts of dibutyl adipate, 4 parts of ethanol, 0.5 part of a silicone emulsion (30% emulsion of 10000 centistoke silicone oil) and 3.5 parts of deionized water to 90 parts of the so prepared emulsion. This starch is designated as "starch R".

EXAMPLE 15

In a 5-neck separable flask equipped with a thermometer, a stirrer, a reflux cooler, a nitrogen-introducing device and a metering dropping device, 8 parts of polyvinyl alcohol (completely saponified product, degree of polymerization = 1800) was dissolved in 130 parts of deionized water at 80° C. After the solution was cooled to 40° C, 0.5 part of poly(N,N-dimethyl-3,5-methylenepiperidium chloride) (viscosity = 30 centipoises (as measured with respect to 1% aqueous solution), 0.5 part of distearyldimethyl ammonium chloride and an aqueous solution of 1 part of sodium carbonate in 10 parts of deionized water were added to the solution, and air in the flask was replaced by nitrogen. Then, 10 parts of monomeric vinyl acetate and 0.1 part of methacryloxyethyltrimethyl ammonium chloride were added to the charge of the flask, and a polymerization initiator comprising 0.1 part of 2,2'-azobis(2-amidinopropane) hydrochloride and 10 parts of deionized water was added and the temperature was elevated to 70° C. to initiate the polymerization. Over a period of 100 minutes from the time at which 10 minutes had passed from the initiation of polymerization, 90 parts of monomeric vinyl acetate was continuously added. After completion of the continuous addition, aging was conducted for 1 hour at 80° C. to complete the emulsion polymerization. When the particle size of the resulting emulsion was measured by an optical microscope, it was found that the average particle size was about 1μ. The solid content was 45.7%.

A starch was prepared by adding 2 parts of dibutyl adipate, 4 parts of ethanol, 0.5 part of a silicone emulsion (30% emulsion of 10000 centistoke silicone oil) and 3.5 parts of deionized water to 90 parts of the so prepared emulsion. This starch is designated as "starch S".

EXAMPLE 16

By using starches P, Q, R and S prepared in Examples 12 to 14 and Example 15 and a commercially available polyvinyl acetate emulsion type starch "KEEPING" (designated as "starch T"), the following starching test was carried out to obtain results shown in Table 11.

Starching Test

A sample starch was diluted with deionized water so that the solid content was 0.4% to form a starching solution, and a cloth was dipped in 100 cc of the starching solution so that the bath ratio was ¼ (namely, the amount of the cloth dipped was 25 g) and the cloth was rubbed with hands for about 30 seconds. Then, the cloth was dehydrated by a dehydrator (a dehydrating tank attached to a National washing machine), air-dried and pressed by an iron at 130° C. for 1 minute. The starch hardness was measured according to the cantilever method of JIS 1005-1959.

Separately, the sample cloth was stored in a thermostat chamber maintained at a temperature of 20° C. and a relative humidity of 65% for 1 day, and the weights of the cloth before and after starching were measured and the starch adhesion ratio was calculated.

Table 11

|  | Starch P | | Starch Q | | Starch R | | Starch S | | Starch T | |
|---|---|---|---|---|---|---|---|---|---|---|
|  | Starch hardness (cm) | Adhesion ratio (%) | Starch hardness (cm) | Adhesion ratio (%) | Starch hardness (cm) | Adhesion ratio (%) | Starch hardness (cm) | Adhesion ratio (%) | Starch hardness (cm) | Adhesion ratio (%) |
| 60-count cotton broadcloth | 8.4 | 93 | 8.3 | 95 | 8.2 | 93 | 6.8 | 42 | 6.4 | 28 |
| 100-count cotton broadcloth | 8.2 | 70 | 8.0 | 65 | 7.2 | 42 | 6.9 | 35 | 6.7 | 28 |
| cotton bathrobe cloth | 6.0 | 70 | 6.0 | 72 | 5.6 | 58 | 5.2 | 48 | 5.0 | 42 |
| cotton sheet (twill fabric) | 6.0 | 92 | 6.0 | 93 | 5.4 | 72 | 5.0 | 60 | 4.8 | 56 |
| cotton voile | 6.5 | 75 | 6.3 | 73 | 6.1 | 63 | 5.8 | 55 | 5.7 | 50 |
| cotton lawn | 5.1 | 65 | 4.9 | 60 | 4.4 | 34 | 4.2 | 23 | 4.0 | 10 |
| cotton grey sheeting | 6.5 | 80 | 6.6 | 86 | 5.9 | 52 | 5.7 | 40 | 5.6 | 31 |

As will be apparent from the results shown in Table 11, each of cationic emulsions provides higher adhesion ratio and higher starch strength than the commercially available nonionic vinyl acetate emulsion (starch T), and samples including quaternary cationic starch (starch P) and quaternary cationic cellulose (starch Q) provide best adhesion ratio and starch strength.

EXAMPLE 17

In a 5-neck separable flask equipped with a thermometer, a stirrer, a reflux cooler, a nitrogen-introducing device and a metering dropping device, 5 parts of hydroxyethylated starch [cation substitution degree = 0.16, viscosity = 30 centipoises (as measured at 20° C. with respect to 1% aqueous solution)], 0.5 part of quaternary cationic cellulose (JR-125 manufactured by Union Carbide Corporation, hydroxyethyl substitution degree = 1.6–2.1, cation substitution degree = 0.35–0.45, nitrogen content = 1.7–2.2%) and an aqueous solution of 0.3 part of sodium orthophosphate in 10 parts of deionized water were charged. Then, air in the flask was replaced by nitrogen, and 10 parts of monomeric vinyl acetate and 0.2 part of a cationic monomer

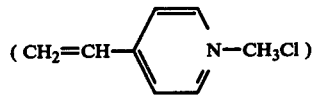

were added to the charge of the flask. Then, a polymerization initiator comprising 0.1 part of 2,2'-azobis(2-amidinopropane) hydrochloride and 10 parts of deionized water was added and the temperature was elevated to 70° C. to initiate the polymerization. Over a period of 100 minutes from the time at which 5 minutes had passed from the initiation of polymerization, 90 parts of monomeric vinyl acetate was continuously added. After completion of the continuous addition, aging was conducted for 1 hour at 80° C. to complete the emulsion polymerization. The resulting emulsion was stable.

A starch was prepared by adding 4 parts of dibutyl adipate, 3 parts of glycerin and 3 parts of deionized water to 90 parts of the so prepared emulsion.

EXAMPLE 18

A stainless steel autoclave was cooled below −50° C., and 90 parts of a 10% aqueous solution of hydroxyethyl cellulose and 0.5 part of trimethylaminoethyl chloridemodified starch of the following formula:

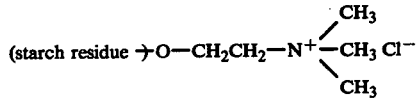

(substitution degree = 1.0, viscosity = 35 centipoises as measured with respect to 1% aqueous solution) were charged in the autoclave. Then, 0.5 part of a 20% aqueous solution of hydrogen peroxide and 70 parts of deionized water were added to the charge of the flask, and 1 part of a 20:80 weight ratio mixture of a cationic polyamide (formed by reacting 1 mole of diethylene triamine with 2 moles of stearic acid, adding 1 mole of epichlorohydrin to the resulting condensate, subjecting the resulting adduct to ring-opening polymerization in the presence of sodium hydroxide and neutralizing the resulting polymer with hydroxyacetic acid) and distearyldimethyl ammonium chloride, an aqueous solution of 0.3 part of sodium carbonate in 3 parts of deionized water, 90 parts of vinyl acetate and 10 parts of ethylene were added to the charge of flask. The autoclave was sealed and the temperature was elevated. The reaction mixture was heated at 60° C. for 2 hours and at 80° C. for 1 hour to effect emulsion polymerization. The emulsion was stable and used for production of a starch.

EXAMPLE 19

A 5-neck separable flask equipped with a thermometer, a stirrer, a reflux cooler and a nitrogen-introducing device was charged with 80 parts of a 10% aqueous solution of hydroxypropyl cellulose, and 58 parts of deionized water, 0.5 part of a cationic surface active agent of the following formula:

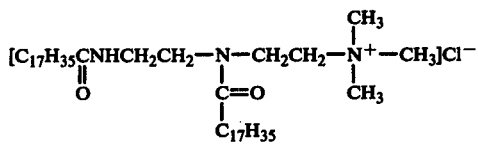

1 part of a quaternary cationic polymer (JR-125) and an aqueous solution of 1 part of disodium phosphate in 10 parts of deionized water were added to the charge of the flask. Then, a portion (10 parts) of a mixture of 55 parts of ethyl acrylate and 45 parts of methyl methacrylate and 0.1 part of cumene hydroperoxide were added to the charge of the flask, and air in the flask was replaced by nitrogen gas. Then, the temperature was elevated to 60° C. to inititate polymerization. Over a period of 100 minutes from the time at which 5 minutes had passed from the start of polymerization, the remainder (90 parts) of the above monomer mixture was continuously added. After completion of the continuous addition, aging was conducted at 80° C. for 1 hour to complete the emulsion polymerization. The resulting polymer emulsion was used as a starting material of a household starch.

EXAMPLE 20

Various emulsions were prepared according to the method described in Example 12 while changing the ratio of polyvinyl alcohol to cationic starch as indicated below.

In a 5-neck separable flask equipped with a thermometer, a stirrer, a reflux cooler, a nitrogen-introducing device and a metering dropping device, M parts of polyvinyl alcohol (completely saponified product, degree of polymerization = 1800) was dissolved in 130 parts of deionized water at 80° C. After the solution was cooled to 40° C., N parts of trimethylaminohydroxyethylated starch of the following formula:

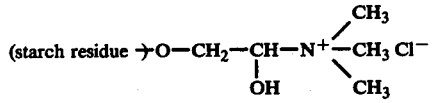

[cation substitution degree = 0.5, viscosity = 30 centipoises (as measured with respect to 1% aqueous solution)], 0.5 part of distearyldimethyl ammonium chloride and an aqueous solution of 1 part of sodium carbonate in 10 parts of deionized water were added to the solution, and air in the flask was replaced by nitrogen gas. Then, 10 parts of monomeric vinyl acetate and 0.1 part of methacryloxyethyltrimethyl ammonium chloride were added to the charge of the flask, and a polymerization initiator comprising 0.1 part of 2,2'-azobis(2-amidinopropane) hydrochloride and 10 parts of deionized water was added and the temperature was elevated to 70° C. to initiate the polymerization. Over a period of 100 minutes from the time at which 10 minutes had passed from the initiation of polymerization, 90 parts of monomeric vinyl acetate was continuously added. After completion of the continuous addition, aging was conducted for 1 hour at 80° C. to complete the emulsion polymerization.

A starch was prepared by adding 2 parts of dibutyl adipate, 4 parts of ethanol, 0.5 part of a silicone emulsion (30% emulsion of 10000 centistoke silicone oil) and 3.5 parts of deionized water to 90 parts of the so prepared emulsion.

By using each of the so prepared starches and a 60count cotton broadcloth, the starch hardness was measured according to the method described in Example 16. Separately, a sample starch was charged in a test tube having a diameter of 13 mm and a length of 75 mm and allowed to stand at 40° C. for 30 days, and the stability was determined (with respect to the supernatant layer) to obtain results shown in Table 12.

Table 2

| Polyvinyl Alcohol (M parts) | Trimethylamino- hydroxyethylated Starch (N parts) | $\frac{N}{M+N} \times 100$ (%) | Starch Hardness (cm) | Stability (mm) |
|---|---|---|---|---|
| 8.0 | 0 | 0 | 6.3 | 0 |
| 7.92 | 0.08 | 1 | 7.4 | 0 |
| 7.76 | 0.24 | 3 | 8.2 | 0 |
| 7.6 | 0.40 | 5 | 8.3 | 0 |
| 7.2 | 0.8 | 10 | 8.4 | 0 |
| 6.4 | 1.6 | 20 | 8.2 | 0 |
| 5.6 | 2.4 | 30 | 7.8 | 0.5 |
| 4.0 | 4.0 | 50 | 7.3 | 1.5 |
| 2.0 | 6.0 | 75 | 7.1 | 4.0 |
| 0 | 8.0 | 100 | 6.8 | 6.5 |

What is claimed is:

1. A household starch composition comprising an emulsion prepared by emulsion polymerizing (a) a vinyl monomer which is not capable of reacting with an alkali to form a salt, in an aqueous solution of (b) polyvinyl alcohol, nonionic modified starch selected from the group consisting of hydroxyethylated starch and hydroxypropylated starch, or nonionic cellulose derivative selected from the group consisting of hydroxyalkylated cellulose and alkyl cellulose, in the presence of (c) a cationic vinyl polymer or a ring-closed polymer of cationic diallyl compound having the formula

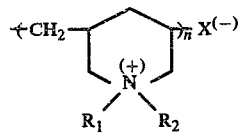

wherein $R_1$ and $R_2$, which can be the same or different, are alkyl or substituted alkyl having 1 or 2 carbon atoms in the alkyl moiety, and X is an anion, and in the presence of (d) a cationic surface active agent, a cationic monomer or mixture of said cationic surface active agent and said cationic monomer.

2. A household starch composition as set forth in claim 1 wherein the viscosity of the cationic vinyl polymer or the said ring-closed polymer of the cationic diallyl compound is 3 to 500 centipoises as measured at 20° C. with respect to a 1% aqueous solution.

3. A household starch composition according to claim 1, in which said vinyl monomer is selected from the group consisting of vinyl esters of fatty acids, esters of acrylic acid and methacrylic acid, acrylamide, styrene, butadiene and chloroprene and the concentration of said vinyl monomer is 20 to 60% by weight, based on the weight of the emulsion; said cationic vinyl polymer and said ring-closed polymer have a viscosity of from 3 to 500 centipoises measured at 20° C. with respect to a 1% aqueous solution and said cationic vinyl polymer is selected from the group consisting of a compound having the formula

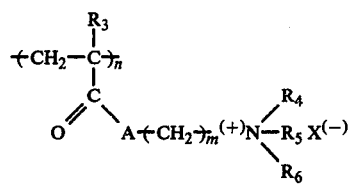

wherein $R_3$ is hydrogen or methyl, $R_4$, $R_5$ and $R_6$, which can be the same or different, are alkyl or substituted alkyl having 1 to 4 carbon atoms in the alkyl moiety, A is oxygen or NH, m is an integer of from 1 to 10, and X is an anion, a compound having the formula

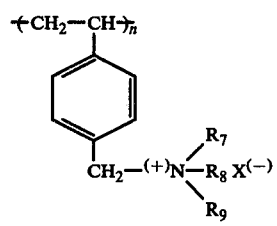

wherein $R_7$, $R_8$ and $R_9$, which can be the same or different, are hydrogen, alkyl or substituted alkyl having 1 to 2 carbon atoms in the alkyl moiety, and X is an anion, the compound

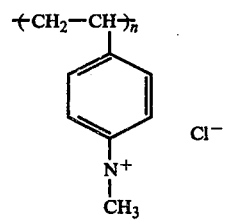

and the compound

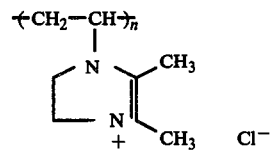

and the amount of said cationic vinyl polymer or said ring-closed polymer of cationic diallyl compound is from 0.05 to 3% by weight, based on the weight of the emulsion; said cationic monomer is selected from the group consisting of a compound having the formula

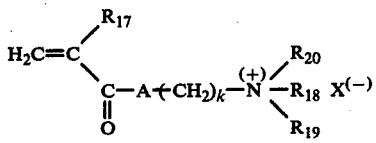

wherein $R_{17}$ is hydrogen or methyl, $R_{18}$, $R_{19}$ and $R_{20}$, which can be the same or different, are hydrogen, alkyl or substituted alkyl group having 1 to 22 carbon atoms in the alkyl moiety, X is an anion, k is an integer of from 1 to 10, A is oxygen or NH, and $R_{18}$, $R_{19}$ and $R_{20}$ may form a ring together with N, a compound having the formula

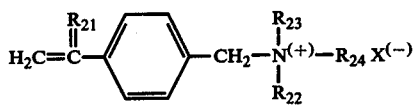

wherein $R_{21}$ is hydrogen or methyl, $R_{22}$, $R_{23}$ and $R_{24}$, which can be the same or different, are hydrogen, alkyl or substituted alkyl group having 1 to 2 carbon atoms in the alkyl moiety, and X is an anion, the compound

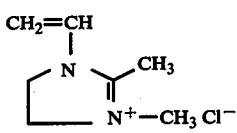

and the compound

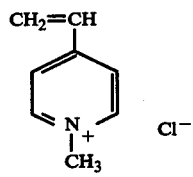

and the amount of said cationic monomer is 0 to 2% by weight, based on the final emulsion; said cationic surface active agent is selected from the group consisting of a compound having the formula

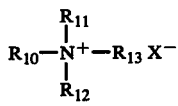

wherein $R_{10}$, $R_{11}$, $R_{12}$ and $R_{13}$ each is hydrogen, alkyl having at least one carbon atom or hydroxyalkyl having at least one carbon atom with the proviso that the sum of the number carbon atoms of these groups is 25 to 50, and X is an anion, a compound having the formula

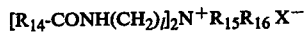

wherein $R_{14}$ is alkyl or substituted alkyl having at least 8 carbon atoms in the alkyl moiety, $R_{15}$ and $R_{16}$, which can be the same or different, are alkyl or substituted alkyl having at least one carbon atom in the alkyl moiety with the proviso that the sum of the number of carbon atoms of the groups $R_{14}$, $R_{15}$ and $R_{16}$ is in the range of from 25 to 50, l is 2 or 3, X is an anion, and $R_{15}$ and $R_{16}$ may form a ring together with N, a compound having the formula

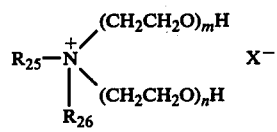

wherein $R_{25}$ is alkyl having at least 8 carbon atoms or $RCOOCH_2CH_2$ in which R is an alkyl group, $R_{26}$ is alkyl having at least one carbon atom, and m and n are integers with the proviso that the sum of m and n is at least 2, a compound having the formula

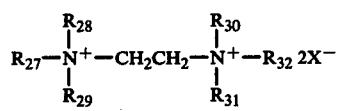

wherein $R_{27}$ is alkyl having at least 8 carbon atoms, and $R_{28}$ to $R_{32}$ are alkyl having 1 to 3 carbon atoms or hydroxyalkyl having 1 to 5 carbon atoms with the proviso that the sum of the number of carbon atoms in the molecule is in the range of from 25 to 50, a compound having the formula

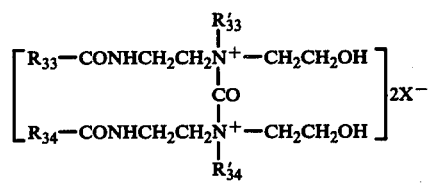

wherein $R_{33}$ and $R_{34}$ are alkyl having at least 8 carbon atoms, $R_{33}'$ and $R_{34}'$ are hydrogen or alkyl having 1 to 3 carbon atoms, and X is an anion, a compound having the formula

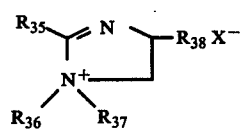

wherein $R_{35}$ is alkyl having at least 8 carbon atoms, $R_{36}$ is —H, —$CH_2CH_2OH$ or —$CH_2CH_2NHCOR_{39}$ in which $R_{39}$ is an alkyl group having at least 1 carbon atom, $R_{37}$ is —H or alkyl having 1 to 5 carbon atoms, $R_{38}$ is —H or —$CH_2OH$, and the sum of the number of carbon atoms of the groups $R_{35}$, $R_{36}$, $R_{37}$ and $R_{38}$ is 30 to 50, a compound having the formula

wherein $R_{40}$ is alkyl group having 20 to 50 carbon atoms, —RO, —$RCOOCH_2$, —$RCONHCH_2$ or —$RCOOCH_2CH_2NHCOCH_2$ in which R is alkyl having 20 to 50 carbon atoms,

is pyridinium, quinolinium or isoquinolinium group, and X is an anion, and a compound having the formula $$R_{41}\text{-}(NHCH_2CH_2)_nNH_2$$

wherein $R_{41}$ is acyl or alkyl having 25 to 50 carbon atoms, and n is an integer of at least 1, and the amount of said cationic surface active agent is from 0 to 5% by weight, based on the weight of the emulsion; said polyvinyl alcohol and said nonionic cellulose derivative have a viscosity of 5 to 10000 centipoises measured at 30° C. with respect to a 5% aqueous solution, and the amount of said polyvinyl alcohol, said nonionic modified starch or said nonionic cellulose derivative is from 0.5 to 10% by weight based on the weight of the emulsion.

4. A household starch composition according to claim 3 in which the amount of said vinyl monomer is from 25 to 50% by weight based on the weight of the emulsion; the amount of said cationic vinyl polymer or said ring-closed polymer is from 0.1 to 1.0% by weight, based on the weight of the emulsion; the amount of said cationic monomer is from 0.02 to 1.0% by weight, based on the weight of the emulsion; the amount of said cationic surface active agent is from 0.2 to 1.5% by weight, based on the weight of the emulsion; and the amount of said polyvinyl alcohol, said nonionic modified starch or said nonionic cellulose derivative is from 1.0 to 4.0% by weight, based on the weight of the emulsion.

5. A household starch composition according to claim 4 in which said vinyl monomer is vinyl acetate.

6. A household starch composition as set forth in claim 3 wherein the cationic vinyl polymer has the formula:

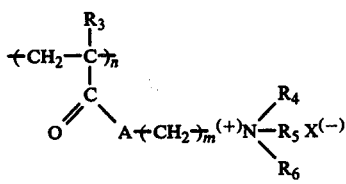

wherein $R_3$ is hydrogen or methyl, $R_4$, $R_5$ and $R_6$, which can be the same or different, are hydrogen, alkyl or substituted alkyl having 1 to 4 carbon atoms in the alkyl moiety, A is oxygen or NH, m is an integer of from 1 to 10, and X is an anion, or the formula:

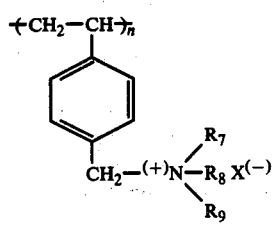

wherein $R_7$, $R_8$ and $R_9$, which can be the same or different, are hydrogen, alkyl or substituted alkyl having 1 to 2 carbon atoms in the alkyl moiety, and X is an anion.

7. A household starch composition as set forth in claim 3 wherein the cationic surface active agent has the formula:

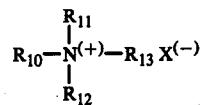

wherein $R_{10}$, $R_{11}$, $R_{12}$ and $R_{13}$, which can be the same or different, are hydrogen, alkyl having at least one carbon atom or hydroxyalkyl group having at least 1 carbon atom with the proviso that the sum of carbon atoms in these groups is in the range of from 25 to 50, and X is an anion.

8. A household starch composition as set forth in claim 3 wherein the cationic surface active agent has the formula:

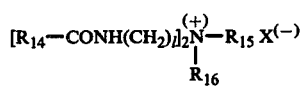

wherein $R_{14}$ is alkyl or substituted alkyl having at least 8 carbon atoms in the alkyl moiety, $R_{15}$ and $R_{16}$, which can be the same or different, are alkyl or substituted alkyl having at least one carbon atom in the alkyl moiety with the proviso that the sum of carbon atoms of the groups $R_{14}$, $R_{15}$ and $R_{16}$ is in the range of from 25 to 50, l is 2 or 3, X is an anion, and $R_{15}$ and $R_{16}$ may form a ring with N, or

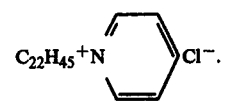

9. A household starch composition as set forth in claim 1 wherein the cationic monomer has at least one nitrogen atom and at least one double bond in the molecule.

10. A household starch composition as set forth in claim 3 wherein the cationic monomer has the formula:

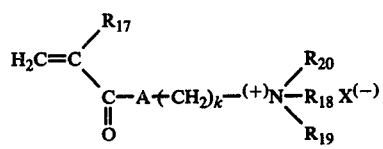

wherein $R_{17}$ is hydrogen or methyl, $R_{18}$, $R_{19}$ and $R_{20}$, which can be the same or different, are hydrogen, alkyl or substituted alkyl having 1 to 22 carbon atoms in the alkyl moiety, X is an anion, k is an integer of from 1 to 10, A is oxygen or NH, and $R_{18}$, $R_{19}$ and $R_{20}$ may form a ring together with N, or the formula:

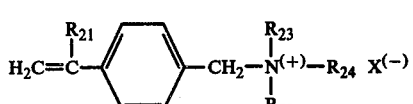

wherein $R_{21}$ is hydrogen or methyl, $R_{22}$, $R_{23}$ and $R_{24}$, which can be the same or different, are hydrogen, alkyl or substituted alkyl having 1 to 2 carbon atoms in the alkyl moiety, and X is an anion.

11. A household starch composition comprising an emulsion prepared by emulsion-polymerizing (a) a vinyl monomer, in an aqueous solution of (b) a non-ionic water-soluble polymer, in the presence of (c) cationic cellulose or cationic starch, and in the presence of (3) a cationic surface active agent, a cationic monomer or mixture of said cationic surface active agent and said cationic monomer.

12. A household starch composition according to claim 11, in which said vinyl monomer is selected from the group consisting of vinyl acetate, vinyl esters of lower fatty acids, acrylic acid esters, and methacrylic acid esters, and the amount of said vinyl monomer is from 20 to 60% by weight based on the weight of the emulsion; said cationic surface active agent is selected from the group consisting of compounds of the formulas

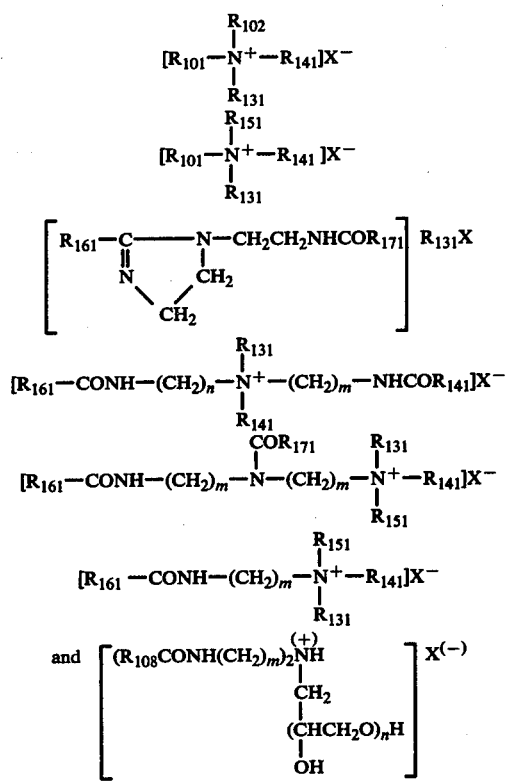

prepared by reacting 1 mole of diethylene triamine or dipropylene triamine with about 2 moles of a fatty acid having 12 to 24 carbon atoms to form a condensate having an acid value lower than 10, adding about 1 to about 2 moles of epichlorohydrin to the thus formed condensate, subjecting the resulting adduct to ring-opening polymerization in the presence of an alkaline agent and neutralizing the resulting polymer, wherein $R_{101}$, $R_{102}$, $R_{161}$ and $R_{171}$ each are alkyl having 11 to 22 carbon atoms or β-hydroxyalkyl having 13 to 24 carbon atoms, $R_{131}$, $R_{141}$ and $R_{151}$ each are alkyl or hydroxyalkyl having 1 to 3 carbon atoms, benzyl or $-(CH_2CH_2O)_nH$, $R_{108}$ is an aliphatic hydrocarbon group having 12 to 24 carbon atoms, n is a number of from 1 to 3, m is 2 or 3, and X is an anion, and the amount of said cationic surface active agent is from 0.1 to 3% by weight, based on the weight of the emulsion; said cationic cellulose or cationic starch has a viscosity of 5 to 1000 centipoises measured at 20° C. with respect to a 1% aqueous solution and has the formula

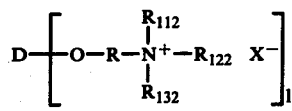

wherein D is a starch or cellulose radical, R is alkylene or hydroxyalkylene, $R_{112}$, $R_{122}$ and $R_{132}$ each is alkyl, aryl or aralkyl group or they form a heterocyclic ring together with the nitrogen atom, X is an anion, and l is a positive integer, wherein 0.01 to 1 cationic group is introduced per anhydroglucose unit of the starch or cellulose, and the amount of said cationic cellulose or cationic starch is from 0.05 to 3% by weight, based on the weight of the emulsion; said cationic monomer is selected from the group consisting of compounds of the formulas

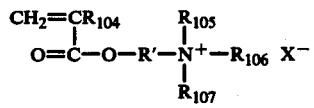

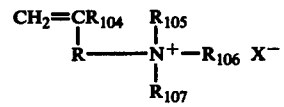

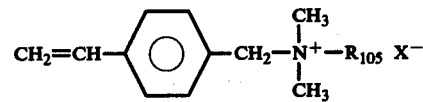

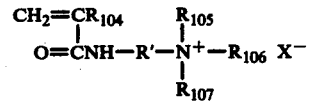

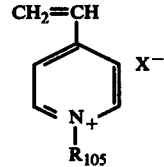

wherein $R_{104}$ is hydrogen or methyl, $R_{105}$, $R_{106}$, $R_{107}$ are hydrogen or alkyl having 1 to 22 carbon atoms or they form a 5- or 6-membered heterocyclic ring together with the nitrogen atom, R' is alkylene having 1 to 10 carbon atoms, and X is an anion, and the amount of said cationic monomer is 0.01 to 2% by weight, based on the weight of the emulsion; and said nonionic water-soluble polymer has a viscosity of 3 to 500 centipoises with respect to a 1% aqueous solution and is selected from the group consisting of polyvinyl alcohol, hydroxyethylated starch, hydroxypropylated starch, hydroxyethyl cellulose and hydroxypropyl cellulose, and wherein the weight ratio of said nonionic water-soluble polymer to said cationic cellulose or cationic starch is from 3/2 to 3/0.01.

13. A household starch composition according to claim 12 in which the amount of said vinyl monomer is from 25 to 50% by weight, based on the weight of the emulsion; said cationic surface active agent has from 25 to 60 carbon atoms and the amount thereof is from 0.2 to 1.5% by weight, based on the weight of the emulsion; the viscosity of said cationic cellulose or cationic starch is from 10 to 500 centipoises, the degree of cation substitution thereof is from 0.02 to 0.5 cationic group per anhydroglucose unit and the amount thereof is from 0.1 to 1.0% by weight, based on the weight of the emulsion; the amount of said cationic monomer is from 0.02 to 1.0% by weight, based on the weight of the emulsion; and the viscosity of said nonionic water-soluble polymer is from 5 to 100 centipoises and the weight ratio of said nonionic water-soluble polymer to said cationic starch or cationic cellulose is from 3/1 to 3/0.03.

14. A household starch composition according to claim 13 in which said vinyl monomer is vinyl acetate.

15. A household starch composition as set forth in claim 11 wherein the cationic cellulose or cationic starch has a quaternary ammonium ion.

16. A household starch composition as set forth in claim 11 wherein the cationic surface active agent or cationic monomer has a cationic ammonium ion.

17. A household starch composition as set forth in claim 15 wherein the cationic cellulose or cationic starch is one having introduced therein from 0.01 to 1 cationic group per anhydroglucose unit.

18. A household starch composition as set forth in claim 11 wherein the weight ratio of the cationic cellulose or cationic starch to the nonionic water-soluble polymer is in the range of from 1/3 to 0.01/3.

19. A household starch composition as set forth in claim 11 wherein the nonionic water-soluble polymer is a polyvinyl alcohol, hydroxyethylated starch, hydroxypropylated starch, hydroxyethyl cellulose or hydroxypropyl cellulose.

20. A household starch composition as set forth in claim 19 wherein the nonionic water-soluble polymer is hydroxyethyl starch.

21. A household starch composition as set forth in claim 19 wherein the nonionic water-soluble polymer is hydroxyethyl cellulose or hydroxypropyl cellulose.

22. A household starch composition as set forth in claim 12 wherein the cationic surface active agent is a compound having the formula:

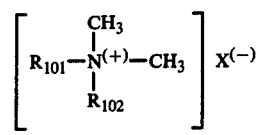

wherein $R_{101}$ and $R_{102}$, which can be the same or different, are alkyl having 11 to 22 carbon atoms or $\beta$-hydroxyalkyl having 13 to 24 carbon atoms, and X is an anion, or the formula:

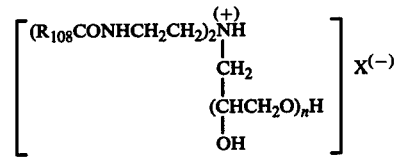

wherein $R_{103}$ is alkyl having 18 to 24 carbon atoms, X is an anion, and n is 2 or 3.

23. A household starch composition as set forth in claim 12 wherein the cationic monomer is a compound having the formula:

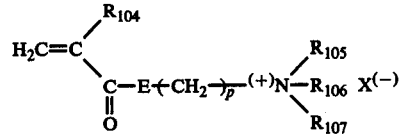

wherein $R_{104}$ is hydrogen or methyl, $R_{105}$, $R_{106}$ and $R_{107}$, which can be the same or different, are hydrogen or alkyl having 1 to 22 carbon atoms or they form a 5- or 6-membered heterocyclic ring together with the nitrogen atom, X is an anion, p is an integer of from 1 to 10, and E is oxygen or NH in the amide linkage.

* * * * *